(12) United States Patent
DuBois et al.

(10) Patent No.: US 11,655,170 B2
(45) Date of Patent: May 23, 2023

(54) PHOTOVOLTAIC EVAPORATION AND DISTILLATION SYSTEM FOR THE RECYCLING OF GREYWATER TO POTABLE WATER

(71) Applicants: Tod DuBois, Newport, OR (US); Dustin Kash, Truckee, CA (US)

(72) Inventors: Tod DuBois, Newport, OR (US); Dustin Kash, Truckee, CA (US)

(73) Assignee: Tod DuBois, Newport, OR (US)

( * ) Notice: Subject to any disclaimer, the term of this patent is extended or adjusted under 35 U.S.C. 154(b) by 0 days.

(21) Appl. No.: 16/153,661

(22) Filed: Oct. 5, 2018

(65) Prior Publication Data

US 2019/0106345 A1      Apr. 11, 2019

Related U.S. Application Data

(60) Provisional application No. 62/606,682, filed on Oct. 5, 2017.

(51) Int. Cl.
| | |
|---|---|
| *C02F 9/00* | (2023.01) |
| *B01D 1/00* | (2006.01) |
| *B01D 24/10* | (2006.01) |
| *B01D 24/46* | (2006.01) |
| *C02F 1/00* | (2023.01) |
| *C02F 3/30* | (2023.01) |
| *C02F 3/04* | (2023.01) |
| *C02F 1/14* | (2023.01) |
| *C02F 103/00* | (2006.01) |
| *C02F 3/06* | (2023.01) |

(52) U.S. Cl.
CPC .............. *C02F 9/00* (2013.01); *B01D 1/0035* (2013.01); *B01D 24/105* (2013.01); *B01D 24/461* (2013.01); *B01D 2101/04* (2013.01); *C02F 1/004* (2013.01); *C02F 1/14* (2013.01); *C02F 3/04* (2013.01); *C02F 3/06* (2013.01); *C02F 3/30* (2013.01); *C02F 2001/007* (2013.01); *C02F 2103/002* (2013.01); *C02F 2201/009* (2013.01); *C02F 2301/046* (2013.01); *C02F 2303/04* (2013.01); *C02F 2303/16* (2013.01)

(58) Field of Classification Search
CPC ...... C02F 1/04; C02F 1/14; C02F 3/06; C02F 3/30; C02F 9/00; C02F 2103/002; C02F 2201/009; C02F 2301/046
See application file for complete search history.

(56) References Cited

U.S. PATENT DOCUMENTS

| | | |
|---|---|---|
| 4,488,935 A | 12/1984 | Ruhe |
| 4,495,034 A | 1/1985 | Lucas |
| 4,566,434 A | 1/1986 | Lindenbauer |
| 4,584,061 A | 4/1986 | Shelton |
| 4,639,293 A | 1/1987 | Lew |
| 2002/0189173 A1* | 12/2002 | Staschik ............ C02F 9/00 52/79.1 |

(Continued)

*Primary Examiner* — Renee Robinson
(74) *Attorney, Agent, or Firm* — Chernoff, Vilhauer, McClung & Stenzel, LLP

(57) ABSTRACT

A photovoltaic evaporation and distillation system for the recycling of wastewater to potable water is disclosed herein. The system is comprised of six components that work in conjunction to produce both a source of reusable water for indoor appliances that produce greywater (or irrigation use), and potable water.

4 Claims, 7 Drawing Sheets

(56) References Cited

U.S. PATENT DOCUMENTS

| | | | |
|---|---|---|---|
| 2004/0025931 A1* | 2/2004 | Aguglia | F24S 10/17 |
| | | | 136/246 |
| 2012/0228117 A1* | 9/2012 | Panunzio | C02F 9/00 |
| | | | 203/10 |
| 2014/0054206 A1* | 2/2014 | O'Regan, Jr. | C02F 3/006 |
| | | | 210/96.1 |
| 2014/0151294 A1* | 6/2014 | Prior | C02F 9/00 |
| | | | 210/605 |

* cited by examiner

PHOTOVOLTAIC EVAPORATION AND DISTILLATION SYSTEM FOR THE RECYCLING OF GREYWATER TO POTABLE WATER

CROSS-REFERENCES TO RELATED APPLICATIONS

This application claims priority to U.S. Provisional Patent Application Ser. No. 62/606,682 filed on Oct. 5, 2017, entitled "SORA Water Recycler-Grey to Potable Water Recycler and Reuse", the disclosure of which is hereby incorporated by reference.

BACKGROUND OF THE INVENTION

The field of invention relates to water distillers, and more particularly pertains to a new and improved solar water re-use system to efficiently and effectively provide potable water economically.

FIELD OF THE INVENTION

Global warming and population growth are increasingly creating water shortages that place great strains on our natural water sources. As we are all aware, many areas within the United States are already experiencing grave water shortages. The Western states and, more specifically, California have numerous locales wherein the current water situation has reached critical stages.

In Southern California a large desalinization plant has been built by one of the local communities to run sea water through reverse osmosis in the conventional manner so as to produce pure drinkable (potable) water. As one can expect, the process is slow, plants are expensive to build and also very expensive to keep in operation. Maintenance of such a plant requires constant monitoring of the filters to insure that deposits do not exceed tolerable limits.

In addition to the above-noted severe water shortage, this country is also experiencing critical difficulties in the disposition of sewage, industrial or agricultural sludge and all other forms of polluted water. The present state of environmental concern demands that individuals and corporations no longer dump their waste by-products in the community sewage system or into the nearest river or tributary.

According to many knowledgeable scientific experts, the world is currently entering into a period of time which future historians may well refer to as the "energy shortage" age. Whether considering (1) the availability of natural gas, (2) the sufficiency of oil reserves, or (3) untapped sources of coal, the consensus appears to indicate that a severe energy crisis is or will soon be an established fact. One consequence, of course, is that a corresponding shortage of electrical power can be foreseen; that is, it will no longer be practical to convert one or more of these energy sources into electrical power.

In a similar vein, many areas of the world, especially those which are arid, face a critical shortage of potable water, both for human consumption and irrigation. Although sparsely located throughout the world, such areas abound particularly in the Middle Eastern countries and in the Northern desert regions of Africa. Coincidentally, many of these countries, or localized areas thereof, either border upon, or are readily accessible to an abundance of solar energy. Also coincidental is the fact that some of these areas appear to have unlimited reserves of fossil fuels which can, albeit inefficiently and uneconomically, be utilized for electrical power generation. The process encompassed by my inventive concept, although not limited to such areas, is primarily applicable thereto.

The invention herein described is principally directed toward a technique for recovering potable water from otherwise used water. Although applicable to the processing of many types of brackish water and/or water having a high degree of salinity, the inventive concept is primarily intended to be utilized in recovering potable water from greywater. Basically, the present invention makes use of the natural radiant solar energy supply to recycle otherwise unpotable greywater. Briefly, the present invention involves the use of the virtually limitless supply of natural solar energy; as hereinafter more specifically set forth, where existing and readily obtainable.

BRIEF SUMMARY OF THE PRESENT INVENTION

With the aforementioned information in mind, Applicant was motivated to direct his ambitions toward solutions of the above noted problems. Applicant has developed a system for the recycling of greywater using solar energy.

Applicant's system utilizes a unique, photovoltaic panel, which includes many energy-saving features not previously utilized in earlier, less efficient systems. For example, applicants' invention provides water suitable for washing as well as potable water that is safe for drinking. Additionally, co-generation of electricity is a further design aspect which increases the overall efficiency of the system. The system is comprised of six components that work in conjunction to produce both a source of reusable water for indoor appliances that produce greywater (or irrigation use), and potable water.

An object of the invention is to provide a system for producing potable water from greywater.

Another object of the invention is to provide a system for producing potable water from greywater which substantially utilizes the sun's energy.

Yet another object of the invention is to provide a system for producing potable water from polluted greywater, and also co-generate electricity for use in the system for heating the greywater.

A further object of the invention is to provide a system for producing potable water from greywater, wherein certain design features are utilized to vastly increase the efficiency of the system.

Yet another object of the invention is to provide a system for producing potable water from greywater, which system includes an evaporating chamber.

A still further object of the invention is to provide a system for producing potable water from greywater that makes use of inoculating microbes.

Another object of the invention is to provide a system for producing potable water that does not require replaceable chemicals or filters and uses mechanical skimming to maintain healthy sand flora.

These and other objects of the instant invention will become more apparent hereinafter. The instant invention will now be described with particular reference to the accompanying drawings which form a part of this specification wherein like reference characters designate the corresponding parts in the several views.

Figure 1:
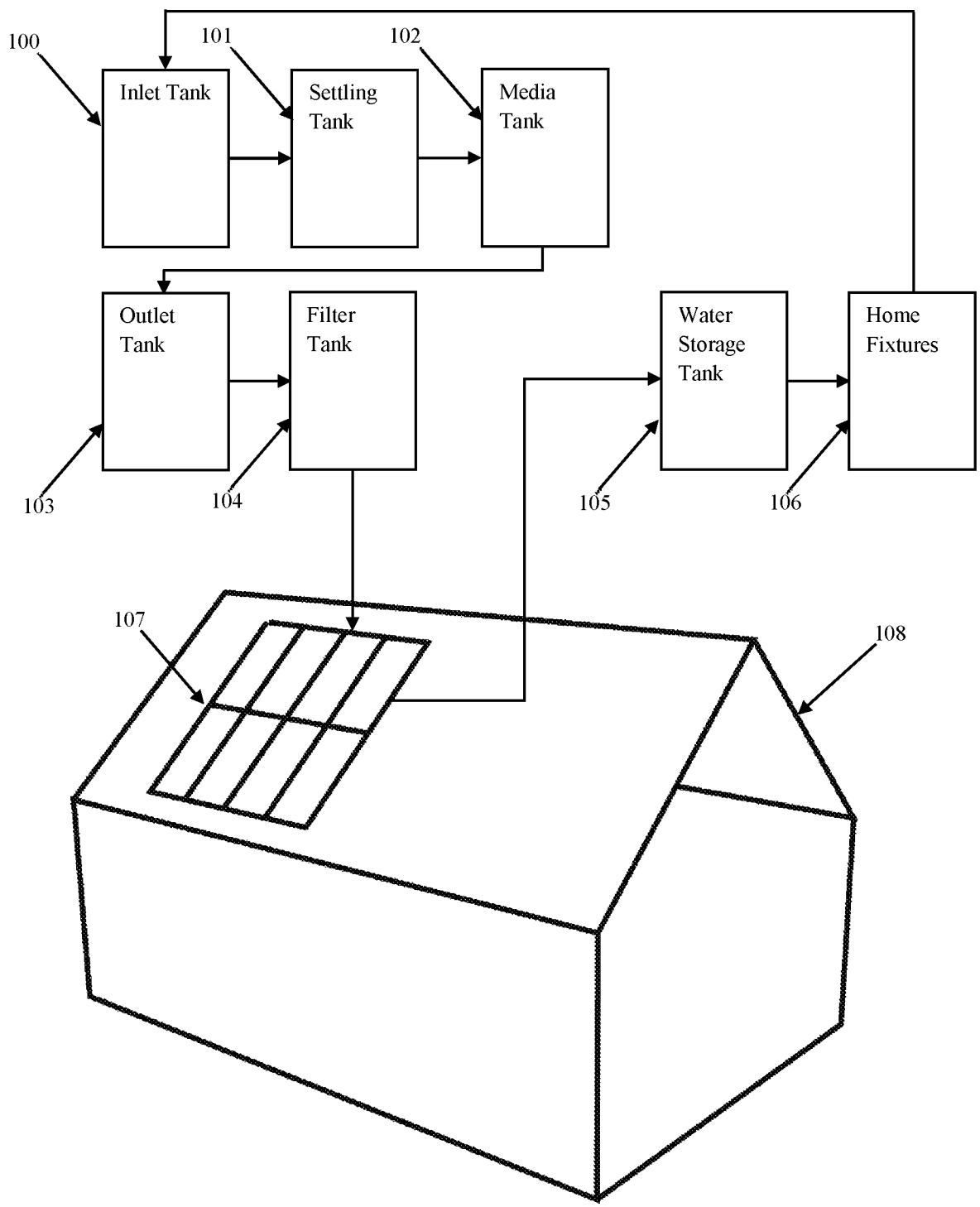
FIG. 1 is a block diagram showing the components of a photovoltaic evaporation and distillation system for the recycling of greywater to potable water as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

For purposes of this Description, the term "greywater" shall include the used water from showers, sinks, and washing machines, is relatively clean water. It may contain bacteria, dirt, detergents, grease, and hair; but it does not come into contact with feces.

Referring to FIG. 1 there is a block diagram showing the components of a photovoltaic evaporation and distillation system for the recycling of greywater to potable water as according to an embodiment of the present invention. The components include an inlet flow stabilization tank (100), a sludge settling and anaerobic disinfection tank (101), a biofilter media tank (102), an outlet flow stabilization tank (103), a sand filter and reusable greywater tank (104), and an active solar distiller (107). The purification components (100-104, 107) convert greywater in to two separate water types; potable water safe for drinking and to wash water for bathtubs and washing machines. The purification components (100-104, 107) are used within a home or residence (108) and provide water to fixtures within the home or residence (106). After purification, recycled water can be stored in a water storage tank (105) until it is used in the home (108). Arrows show the flow of water throughout the purification components (100-104, 107) and fixtures (106) of a home (108).

Figure 2:
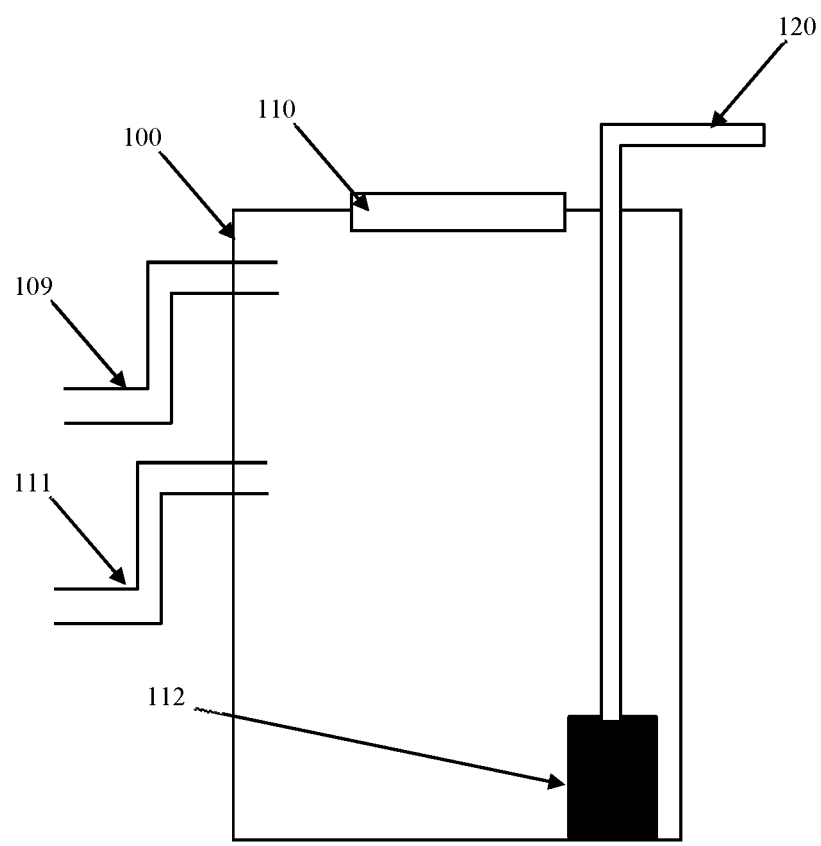
FIG. 2 is a block diagram showing the components of an inlet flow stabilization tank as according to an embodiment of the present invention.

Referring now to FIG. 2, there is shown an inlet flow stabilization tank (100). The inlet flow stabilization tank (100) stabilizes the variable flows from the greywater-producing sources (106) such as sinks, showers, faucets, within a home (108). Greywater enters the inlet tank (100) through a graywater inlet port (109). If the outlet flow stabilization tank (103) overflows, water is pumped back into the inlet flow stabilization tank (100) via the outlet flow return tube (111). The greywater recycling system requires a consistent flow without surges to properly disinfect the greywater. The inlet tank (100) also allows solids to settle, which reduces the overall strain on the recycling system. The inlet tank (100) can have an access port (110) that allows a user to access the interior of the tank (100) and components located therein.

A surge pump (112) is submerged in the inlet tank (100) to transfer the water into the next of the purification components, the sludge settling and anaerobic disinfection tank (101). The greywater is pumped through an inlet tank greywater transfer tube (120) to the sludge settling tank (101).

Figure 3:
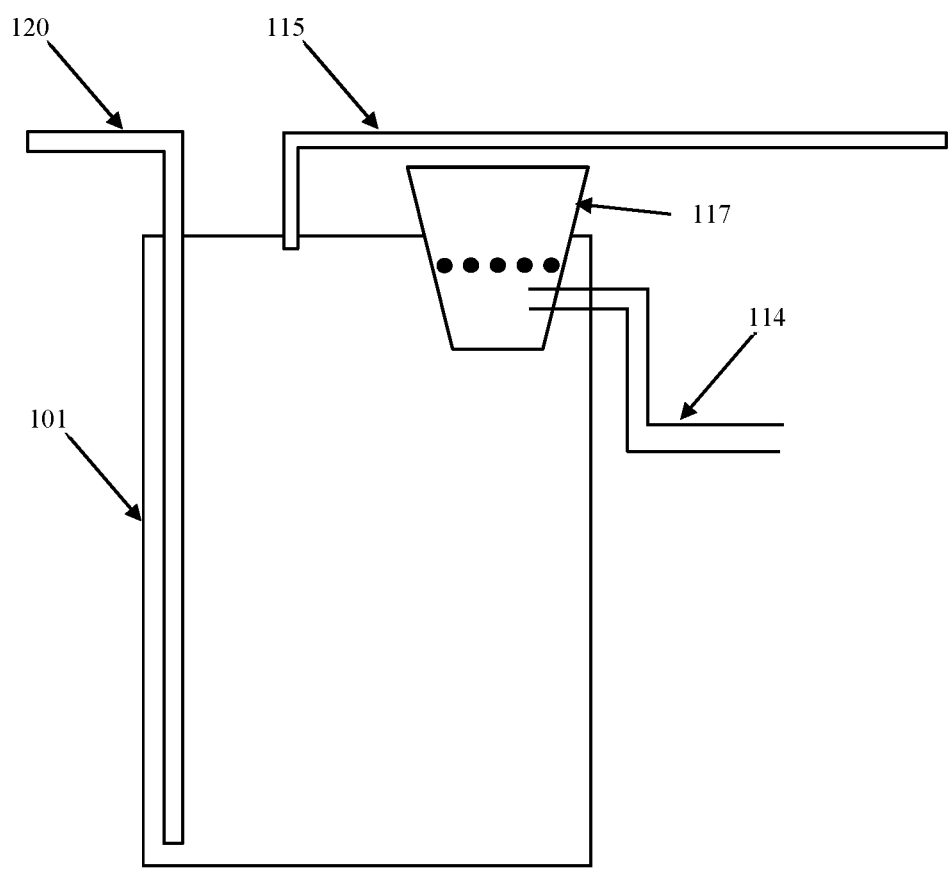
FIG. 3 is a block diagram showing the components of sludge settling and anaerobic disinfection tank as according to an embodiment of the present invention.

Referring now to FIG. 3, there is shown a sludge settling and anaerobic disinfection tank (101). In the sludge settling and anaerobic disinfection tank (101), the consistent flow of greywater from the inlet flow stabilization tank (100) causes the greywater to come into contact with an anaerobic sludge layer inside the anaerobic disinfection tank (101). Water enters the disinfection tank (101) through the inlet tank greywater transfer tube (120). The microbes in the sludge anaerobically digest most of the settleable solids which contain a majority of the health-threatening impurities, such as pathogens. Here, the biological oxygen demand (or BOD) and volume of sludge and contaminating solids from the greywater sources is significantly reduced. The disinfection tank (101) fills until it reaches overflow, where gravity then transfers the partially-treated water into the third component of the purification components, the biofilter media tank (102).

An overflow chamber (117) within the disinfection tank (101) is located near the top of the tank (101). A plurality of holes exist in the housing of the overflow chamber (117) that allows water to enter the chamber (117) when the disinfection tank (101) fills up. A disinfection tank transfer tube (114) allows water to flow out of the disinfection tank (101) and in to the biofilter media tank (102) when the disinfection tank (101) is full. A sludge return line (115) allows sludge from a biofilter (119) in the biofilter tank (102) to flow back into the disinfection tank (101) for additional treatment.

Figure 4:
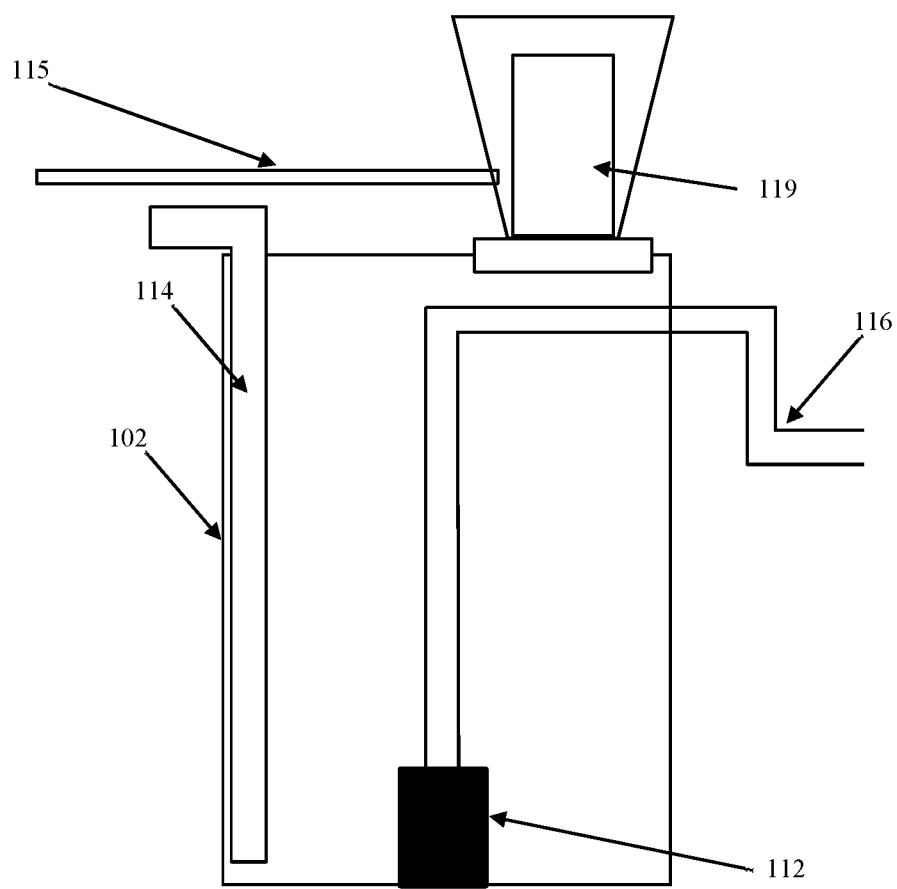
FIG. 4 is a block diagram showing the components of biofilter media tank as according to an embodiment of the present invention.

Referring now to FIG. 4 there is shown a biofilter media tank (102). The suspended solids and other impurities that have not been disinfected in the disinfection tank (101) are pumped into the biofilter media tank through the disinfection tank transfer tube (114). The solids and other impurities are treated in the biofilter media tank (102). An aerobic contact zone is created as the water from the disinfection tank (101) is pumped over a biofilter (119) that is made of filter material and geofabric. Here, colonized aerobic microbes are encouraged to spread over the surface area of the biofilter (119), while smaller settleable solids/impurities and BOD are filtered and removed. The sludge return line (115) diverts a portion of these microbe colonies back into the disinfection tank (101) to sustain the anaerobic contact and disinfection. After this step, the water is suitable for reuse in greywater producing sources/appliances. The water is then transferred to an outlet flow stabilization tank (103) with a surge pump (112). Water is pumped to the outlet flow stabilization tank (103) through an outlet flow tank tube (116).

Figure 5:
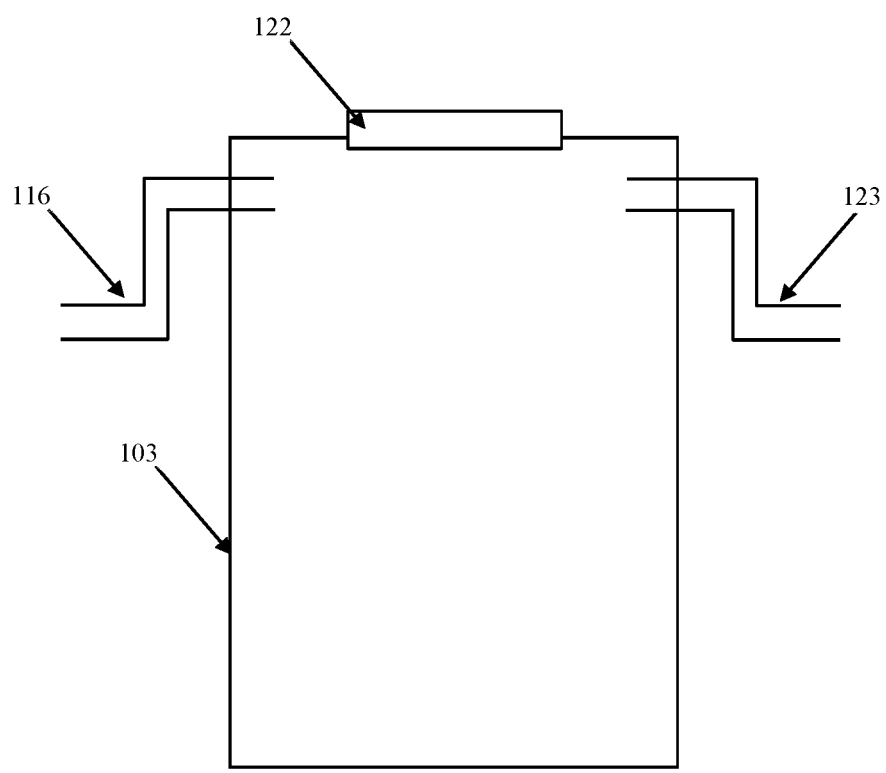
FIG. 5 is a block diagram showing the components of an outlet flow stabilization tank as according to an embodiment of the present invention.

Referring now to FIG. 5 there is shown an outlet flow stabilization tank (103). Water enters the stabilization tank (103) through the outlet flow tank tube (116). The outlet flow stabilization tank (103) collects the treated greywater and allows a stable flow to be pumped and reused back into the home's (108) greywater producing sources and appliances. A stabilization tank access port (122) allows a user to access the interior of the stabilization tank (103). If the flow into the outlet tank (103) reaches capacity, it is diverted back to the inlet tank (100). The outlet flow stabilization tank (103) is where the sand filter and reusable greywater tank (104) (the step that produces potable, distilled water) draws its water. Water is transferred to the sand filter and reusable greywater tank (104) through the greywater transfer tube (123).

Figure 6:
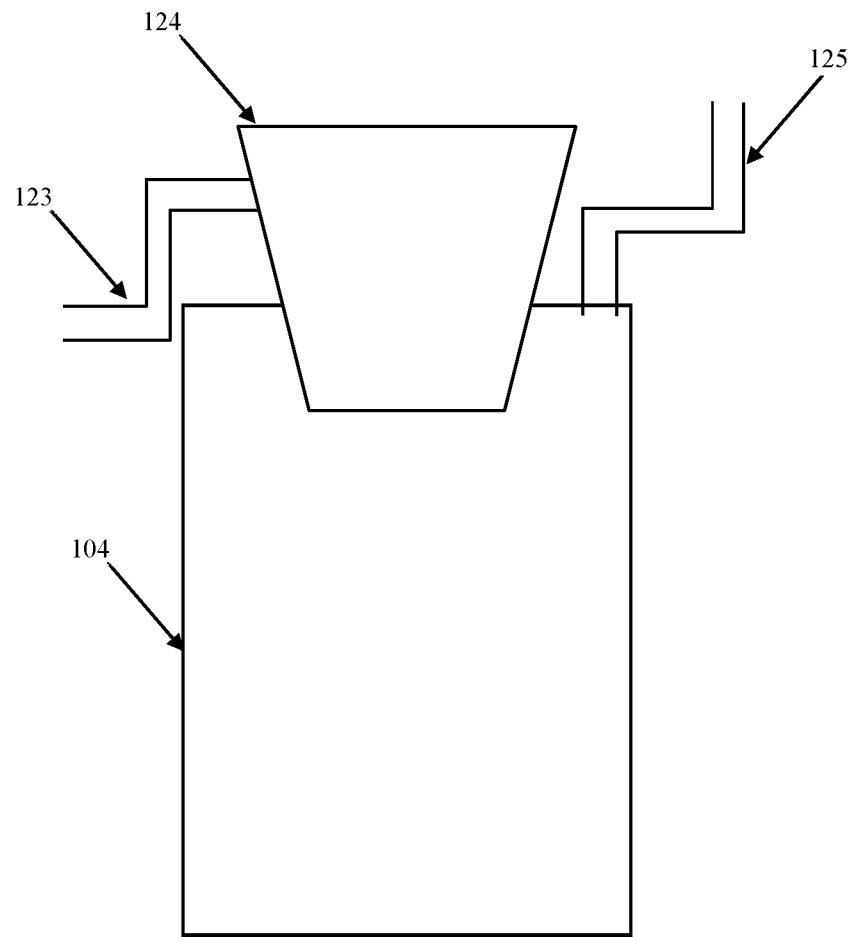
FIG. 6 is a block diagram showing the components of sand filter and reusable greywater tank as according to an embodiment of the present invention.

Referring now to FIG. 6 there is shown a sand filter and reusable greywater tank (104). The sand filter and reusable greywater tank (104) utilizes a sand container (124) that is a bin filled with sand to remove remaining settleable solids and particles. Water from the outlet flow stabilization tank (103) enters the sand container (124) through the greywater transfer tube (123). A small mechanical skimmer maintains optimal sludge levels on the top layer of sand, and dumps the waste into a return line to the inlet flow stabilization tank (100). Water leaves the reusable greywater tank (104) through a solar distiller transfer tube (125) and enters the solar distiller (107).

The solar distiller (107) resembles a traditional solar panel and can be located on the roof of a home (108) or anywhere that exposes the distiller (107) to solar radiation. The solar distiller (107) comprises a dielectric mirror and glass tubes that is optimized for 254 nm ultraviolet light. A distillation chamber within the distiller (107) is located above a stainless-steel quilt, or other envelope that is optimized for surface area and water flow. Below the quilt layer is an insulation layer. Water within the quilt layer is heated, evaporated, and condenses on the mirror or glass tubes. The condensed water is distilled and transferred to the water storage tank (105). The water in the storage tank (105) is potable and safe for human consumption.

Figure 7:
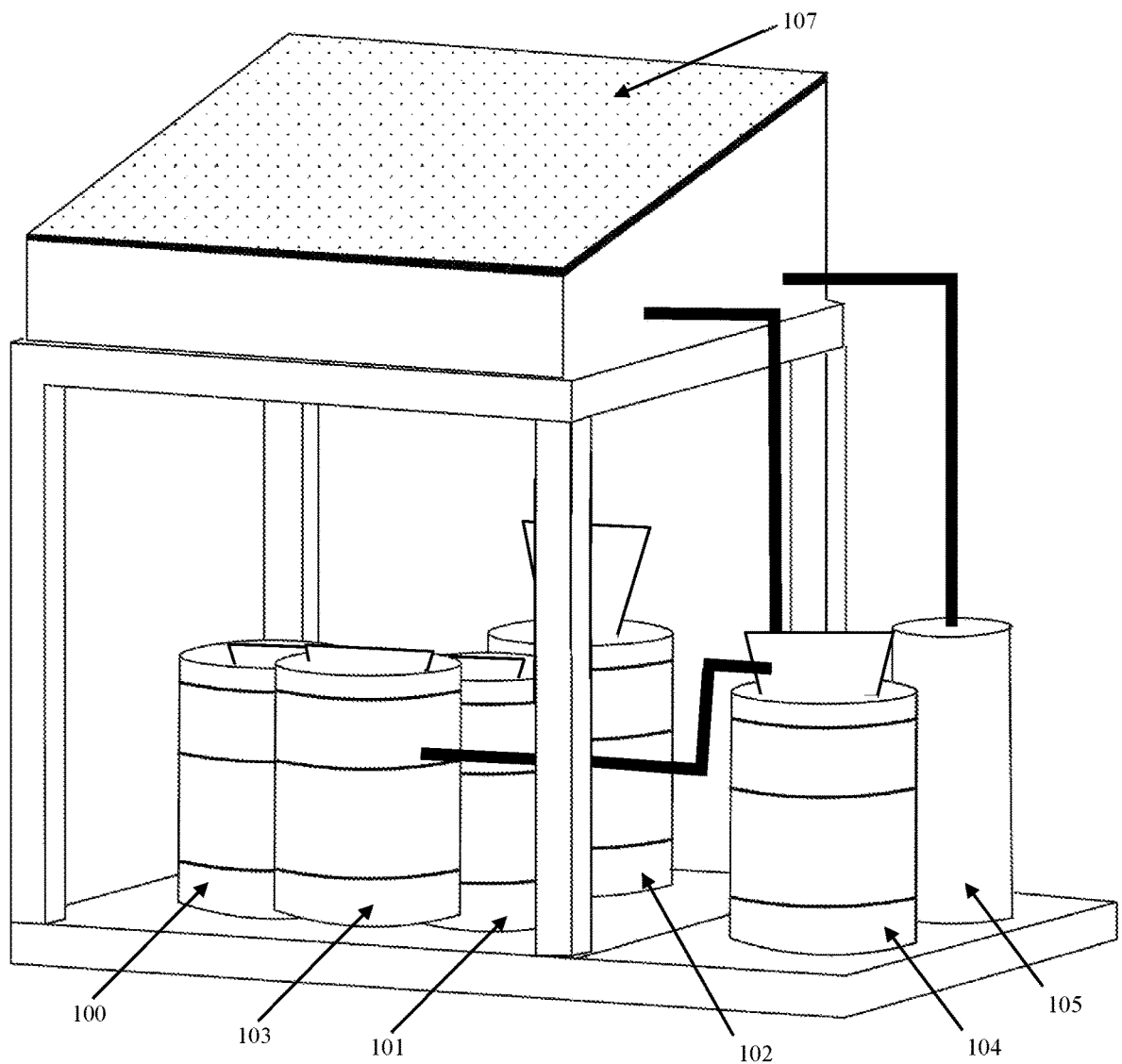
FIG. 7 is a block diagram showing the components of a photovoltaic evaporation and distillation system as a stand-alone unit for the recycling of greywater to potable water as according to an embodiment of the present invention.

Referring now to FIG. 7 there is shown a block diagram of the components of a photovoltaic evaporation and distillation system as a standalone unit for the recycling of greywater to potable water as according to an embodiment of the present invention. In this embodiment the present invention is constructed to be a separate unit that can be placed adjacent to a home. The unit comprises the same components of the system illustrated in FIG. 1. but assembled in self-contained structure. The standalone unit comprises the inlet flow stabilization tank (100), the sludge settling and anaerobic disinfection tank (101), the biofilter media tank (102), the outlet flow stabilization tank (103), the sand filter and reusable greywater tank (104), and the active solar distiller (107). As with the system illustrated in FIG. 1, the purification components (100-104, 107) convert greywater in to two separate water types; potable water safe for drinking and to wash water for bathtubs and washing machines.

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for creating assignments in an incident command system. Further, since numerous modifications and changes will readily occur to those skilled in the art, it is not desired to limit the method for creating assignments in an incident command system to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A system for the recycling of wastewater to potable water comprising:
    (a) an inlet flow stabilization tank, where said inlet flow stabilization tank receives variable flows from greywater-producing sources that are free from being filtered from said greywater-producing sources prior to being received by said inlet flow stabilization tank, where said inlet flow stabilization tank stores received said variable flows from greywater-producing sources, where solids in said variable flows from greywater-producing sources are permitted to settle in said inlet flow stabilization tank as a result of gravity, and a pump that pumps said variable flows from greywater-producing sources from within said inlet flow stabilization tank to a sludge settling and anaerobic disinfection tank;
    (b) said sludge settling and anaerobic disinfection tank where said variable flows come into contact with an anaerobic sludge layer which reduces a biological oxygen demand and volume of said variable flows, where first materials are provided to a biofilter media tank by overflow of said sludge settling and anaerobic disinfection tank, where said overflow passes through an overflow chamber attached to said sludge settling and anaerobic disinfection tank that includes a passage for said first materials and said overflow chamber defines a plurality of openings above said passage where said overflow chamber defines a region suitable to maintain a part of said first materials that pass through said plurality of openings;
    (c) said biofilter media tank that receives an input of said first materials from said sludge settling and anaerobic disinfection tank, said biofilter media tank comprising a biofilter, wherein fluid received by said biofilter media tank is pumped over said biofilter, a sludge return line allowing sludge from said biofilter to flow back into said settling and anaerobic disinfection tank for additional treatment, a biofilter media tank pump that pumps materials from said biofilter media tank to an outlet flow stabilization tank;
    (d) said outlet flow stabilization tank that includes a diversion that directs overflow to said inlet flow stabilization tank, and fluids from said outlet flow stabilization tank are provided to a sand filter and reusable greywater tank;
    (e) said sand filter and reusable greywater tank includes a sand filter through which the fluids are passed, a skimmer that periodically dumps sludge from a top layer of said sand filter into a return line that is provided to said inlet flow stabilization tank; and
    (f) an active solar distiller that receives flow from said sand filter and reusable greywater tank;
    (g) wherein the inlet flow stabilization tank is designed to receive greywater from a home, the sludge settling and anaerobic disinfection tank is designed to receive water from the inlet flow stabilization tank, the biofilter media tank is designed to receive water from the sludge settling and anaerobic disinfection tank, the outlet flow stabilization tank is designed to receive water from the biofilter media tank, the sand filter and reusable greywater tank is designed to receive water from the outlet flow and stabilization tank, and the active solar distiller is designed to receive water from the sand filter and reusable greywater tank.

2. The system of claim 1 further comprising a water holding tank that receives water from the solar distiller.

3. The system of claim 1 wherein water is distilled within the active solar distiller.

4. The system of claim 1 wherein the system produces potable water and greywater that is suitable for washing or bathing.

* * * * *